United States Patent
Kim

(10) Patent No.: US 11,294,043 B2
(45) Date of Patent: Apr. 5, 2022

(54) ULTRASONIC SENSOR DEVICE AND SENSING METHOD OF ULTRASONIC SENSOR DEVICE

(71) Applicant: HYUNDAI MOBIS CO., LTD., Seongnam-si (KR)

(72) Inventor: Hyun Kim, Seoul (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 520 days.

(21) Appl. No.: 15/783,814

(22) Filed: Oct. 13, 2017

(65) Prior Publication Data

US 2018/0106893 A1    Apr. 19, 2018

(30) Foreign Application Priority Data

Oct. 18, 2016    (KR) .................. 10-2016-0135338

(51) Int. Cl.
  *G01S 7/52*       (2006.01)
  *G01S 15/10*      (2006.01)

(52) U.S. Cl.
  CPC .......... *G01S 7/52004* (2013.01); *G01S 15/10* (2013.01)

(58) Field of Classification Search
  CPC ......... G01S 7/52; G01S 15/10; G01S 7/52004
  See application file for complete search history.

(56) References Cited

U.S. PATENT DOCUMENTS 9,139,222 B2 *   9/2015  Potter ................... B62D 6/00
9,150,227 B1 *  10/2015  Habermehl ......... B61L 15/0072
10,322,675 B2 *  6/2019  Naboulsi ................ B60R 1/025
10,441,181 B1 * 10/2019  Telfort .................. A61B 5/0295
2001/0012238 A1 *  8/2001  Iwasaki .................. G01S 7/527
                                                          367/99

(Continued)

FOREIGN PATENT DOCUMENTS

JP      10-268035       10/1998
KR   10-1998-0055772     6/1999
KR   10-2015-0043664 A    4/2015

OTHER PUBLICATIONS

English translation of German Office Action No. 10 2017 124 133.7 dated Jan. 22, 2021.

*Primary Examiner* — Isam A Alsomiri
*Assistant Examiner* — Amie M Ndure
(74) *Attorney, Agent, or Firm* — Morgan, Lewis & Bockius LLP

(57) ABSTRACT

Provided is an ultrasonic sensor device and a sensing method thereof. The device includes a driving unit for providing a transmission pulse to a transducer which transmits an ultrasonic wave and receives an echo of the ultrasonic wave; an amplifier for amplifying an electrical signal for the echo; an analog-to-digital converter for converting the amplified electrical signal into an original digital signal; a signal processor for performing an envelope extraction processing of the original digital signal to generate an extracted signal; and a control unit for outputting a distance signal with respect to an external object based on the original digital signal and the extracted signal, wherein the control unit includes: a test frequency generator for applying a test frequency signal to the transducer, and an excitation frequency measuring unit for measuring the excitation frequency generated in the transducer.

4 Claims, 2 Drawing Sheets

(56) References Cited

U.S. PATENT DOCUMENTS

| | | | |
|---|---|---|---|
| 2001/0020777 A1* | 9/2001 | Johnson | B60R 21/01536 |
| | | | 280/735 |
| 2002/0009015 A1* | 1/2002 | Laugharn, Jr. | B01J 19/10 |
| | | | 366/108 |
| 2002/0145042 A1* | 10/2002 | Knowles | B82Y 15/00 |
| | | | 235/462.01 |
| 2002/0169394 A1* | 11/2002 | Eppstein | A61B 5/150083 |
| | | | 600/573 |
| 2003/0018260 A1* | 1/2003 | Erikson | A61B 8/4483 |
| | | | 600/447 |
| 2003/0028107 A1* | 2/2003 | Miller | A61B 5/6819 |
| | | | 600/437 |
| 2004/0006271 A1* | 1/2004 | Golland | G01S 7/5205 |
| | | | 600/443 |
| 2005/0137479 A1* | 6/2005 | Haider | A61B 8/06 |
| | | | 600/440 |
| 2007/0044559 A1* | 3/2007 | Andrews | G01N 29/4427 |
| | | | 73/584 |
| 2007/0088213 A1* | 4/2007 | Poland | G01S 7/52084 |
| | | | 600/437 |
| 2008/0034863 A1 | 2/2008 | Bartoli et al. | |
| 2009/0046538 A1* | 2/2009 | Breed | B60R 25/102 |
| | | | 367/93 |
| 2009/0306510 A1* | 12/2009 | Hashiba | G01S 15/8925 |
| | | | 600/447 |
| 2010/0109938 A1* | 5/2010 | Oswald | G01S 13/522 |
| | | | 342/90 |
| 2011/0190972 A1* | 8/2011 | Timmons | G08G 1/166 |
| | | | 701/31.4 |
| 2011/0261652 A1 | 10/2011 | Horsky et al. | |
| 2012/0070013 A1* | 3/2012 | Vau | G10K 11/17817 |
| | | | 381/71.4 |
| 2013/0144165 A1* | 6/2013 | Ebbini | A61B 8/14 |
| | | | 600/439 |
| 2016/0012465 A1* | 1/2016 | Sharp | G06Q 20/384 |
| | | | 705/14.17 |
| 2017/0305349 A1* | 10/2017 | Naboulsi | B60R 1/025 |
| 2020/0022680 A1* | 1/2020 | Bharat | G01S 15/8934 |
| 2020/0064469 A1* | 2/2020 | Trahey | G01S 7/52053 |

* cited by examiner

ULTRASONIC SENSOR DEVICE AND SENSING METHOD OF ULTRASONIC SENSOR DEVICE

CROSS-REFERENCE TO RELATED APPLICATIONS

This application claims priority to and the benefit of Korean Patent Application No. 10-2016-0135338 filed in the Korean Intellectual Property Office on Oct. 18, 2016, the entire contents of which are incorporated herein by reference.

BACKGROUND

Field of the Invention

The present invention relates to an ultrasonic sensor, and more particularly, to an ultrasonic sensor device and a sensing method of an ultrasonic sensor device.

Related Technology

Recently, automakers are developing vehicle safety related technologies and introducing more advanced safety technologies to the market. A typical example of this is the Advanced Driver Assistance System (ADAS), which is mainly used in connection with parking. Particularly, parking assistance system and automatic parking assistance system are widely used to inform the distance between the vehicle and object during parking. Key technologies in this system include a technology to measure the position of objects around the vehicle or the distance between the objects and the vehicle through an ultrasonic sensor.

The ultrasonic sensor is a sensor that emits an ultrasonic wave having a frequency of 20 KHz or more in an inaudible band and then senses an ultrasonic echo reflected from an external object to measure a distance to the external object. In automobiles, the ultrasonic echo sensed by the ultrasonic sensor is utilized to measure the distance to an object around the automobile, and to inform the driver in various ways such as a warning sound, display on the vehicle display, and the like.

However, the distance measuring apparatus utilizing the conventional ultrasonic sensor has limitations in the range of distance or accuracy. In particular, as the demand for various application fields exceeding the limits of the sensing range and accuracy of the conventional ultrasonic sensor is gradually increased, improvement of existing systems for measuring the distance using the ultrasonic sensor has become urgent. For example, it has become necessary to extend the sensing range of existing ultrasonic sensors and improve their accuracy for a variety of reasons, such as being able to sense a shorter distance for more efficient parking in a narrow parking space.

Such a conventional ultrasonic sensor device operates at constant transmission/reception frequencies irrespective of changes in the place of installation of the ultrasonic sensor and the ambient environment in which the ultrasonic sensor device is installed. Therefore, the ultrasonic sensor device has a limited capability of sensing objects.

A related prior art is U.S. Pat. No. 7,046,015 (granted on May 16, 2006).

SUMMARY

The present invention has been made in an effort to solve or mitigate various problems including the above problems.

An object of the present invention is to provide an ultrasonic sensor device and a sensing method thereof, in which the frequency is applied in the resonance frequency band of the transducer to find the frequency of the reverberation signal of the transducer, and then the amplitudes at the respective frequencies are compared together to determine the optimum transmission and reception frequencies of the transducer such that an optimal transmission and reception frequency is found according to the physical shape and size of the transducer and an optimal transmission and reception frequency of the transducer is also found in various environments (temperature, humidity, decrepitude, etc.). Therefore, an effect of improving the sensing ability of the object is achieved. However, these problems are only for illustrative purposes and the scope of the present invention is not limited thereto.

According to an aspect of the present invention, an ultrasonic sensor device is provided. The ultrasonic sensor device includes: a driving unit for providing a transmission pulse to a transducer which transmits an ultrasonic wave and receives an echo of the ultrasonic wave; an amplifier for amplifying an electrical signal for the echo; an analog-to-digital converter for converting the amplified electrical signal into an original digital signal; a signal processor for performing an envelope extraction processing of the original digital signal to generate an extracted signal; and a control unit for outputting a distance signal with respect to an external object based on the original digital signal and the extracted signal, wherein the control unit may include: a test frequency generator for applying a test frequency signal to the transducer, and an excitation frequency measuring unit for measuring the excitation frequency generated in the transducer In the ultrasonic sensor device, the excitation frequency generated in the transducer may be a resonance frequency of the transducer.

In the ultrasonic sensor device, the excitation frequency may be a frequency of an excitation freely oscillating in an excitation mode range between a transmission mode and a reception mode of the transducer.

In the ultrasonic sensor device, the control unit may further include: an optimum frequency calculator for calculating an optimum frequency using the excitation frequency, and a transmission pulse calibrator for calibrating the transmission pulse frequency in consideration of the optimum frequency.

In the ultrasonic sensor device, the optimum frequency may be an intermediate value between the excitation frequency and an anti-resonant frequency.

According to an aspect of the present invention, a sensing method of an ultrasonic sensor device that includes a driving unit for providing a transmission pulse to a transducer, which transmits an ultrasonic wave and receives the echo of the ultrasonic wave, an amplifier for amplifying an electrical signal for the echo, an analog-to-digital converter for converting the amplified electrical signal into an original digital signal, a signal processor for performing an envelope extraction processing of the original digital signal to generate an extracted signal, and a control unit for outputting a distance signal with respect to an external object based on the original digital signal and the extracted signal is provided. The method includes: a test frequency application step for applying a test frequency signal to the transducer; an excitation frequency measurement step for measuring an excitation frequency generated in the transducer according to the test frequency signal; an optimum frequency calculation step for calculating an optimum frequency using the excitation frequency; and a transmission pulse frequency calibration step for calibrating a transmission pulse frequency in consideration of the optimum frequency.

In the sensing method, in the excitation frequency measurement step, the excitation frequency generated in the transducer may be a resonance frequency of the transducer.

In the sensing method, in the excitation frequency measurement step, the excitation frequency may be a frequency of an excitation freely oscillating in an excitation mode range between a transmission mode and a reception mode of the transducer.

In the sensing method, the optimum frequency calculation step may be a step for calculating an intermediate value between the excitation frequency and an anti-resonant frequency.

Advantageous Effects

According to an embodiment of the present invention as described above, the frequency is applied in the resonance frequency band of the transducer to find the frequency of the reverberation signal of the transducer, and then the amplitudes at the respective frequencies are compared together to determine the optimum transmission and reception frequencies of the transducer such that an optimal transmission and reception frequency is found according to the physical shape and size of the transducer and an optimal transmission and reception frequency of the transducer is also found in various environments (temperature, humidity, old age, etc.). Therefore, an effect of improving the sensing ability of the object is achieved. Of course, the scope of the present invention is not limited by these effects.

EXPLANATION OF REFERENCE NUMERALS

Figure 1:
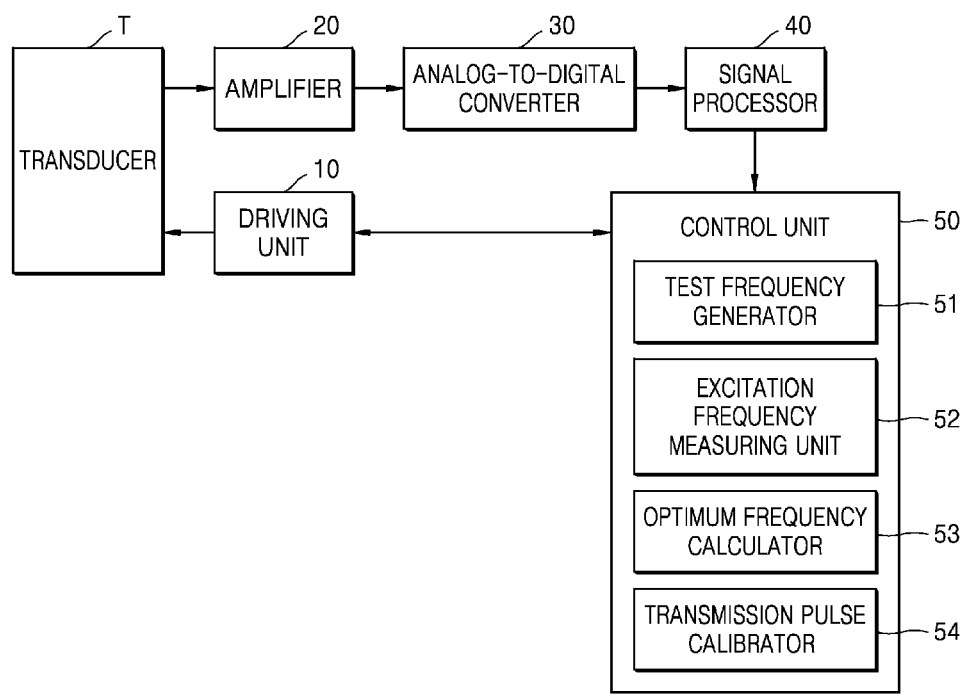
FIG. 1 is a schematic view showing an ultrasonic sensor device according to an embodiment of the present invention.

10: driving unit
20: amplifier
30: analog-to-digital converter
40: signal processor
50: control unit
51: test frequency generator
52: excitation frequency measuring unit
53: optimum frequency calculator
54: transmission pulse calibrator
T: transducer
RF: excitation frequency
OF: optimum frequency
AF: anti-resonant frequency

DETAILED DESCRIPTION

Hereinafter, embodiments of the present invention will be described in detail with reference to the accompanying drawings.

These embodiments are provided so that this disclosure will be thorough and complete, and will fully convey the scope of the invention to those skilled in the art. However, it should be understood that the present invention is not limited to the embodiments described below, but may be embodied in various other forms. Rather, these embodiments are provided so that this disclosure will be more thorough and complete, and will fully convey the scope of the invention to those skilled in the art. Also, the thickness or size of each layer in the drawings is exaggerated for convenience and clarity of explanation.

Figure 2:
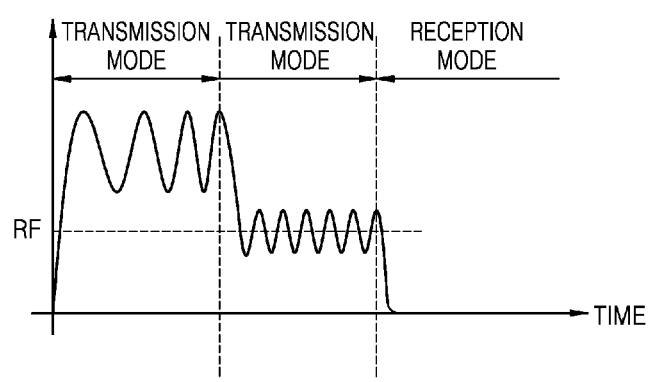
FIG. 2 is a graph showing transmission and reception frequencies generated by a transducer of the ultrasonic sensor device of FIG. 1.
Figure 3:
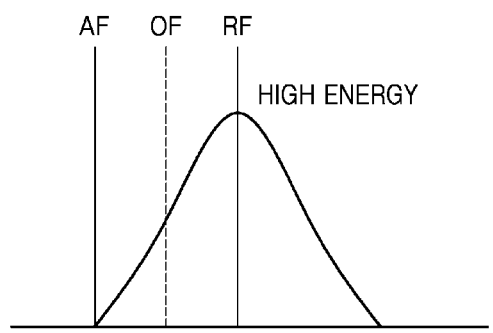
FIG. 3 is a graph showing the excitation frequency generated in the transducer of the ultrasonic sensor device of FIG. 1.

FIG. 1 is a schematic view showing an ultrasonic sensor device according to an embodiment of the present invention, FIG. 2 is a graph showing transmission and reception frequencies generated by a transducer of the ultrasonic sensor device of FIG. 1, and FIG. 3 is a graph showing the excitation frequency generated in the transducer of the ultrasonic sensor device of FIG. 1.

As shown in FIG. 1, an ultrasonic sensor device according to an embodiment of the present invention may include a driving unit 10, an amplifier 20, an analog-to-digital converter 30, a signal processor 40, and a control unit 50.

As shown in FIG. 1, the driving unit 10 may provide a transmission pulse to a transducer T, which transmits an ultrasonic wave and receives the echo of the ultrasonic wave. More specifically, the driving unit 10 can provide the transmission pulse to the transducer T such that the transducer T oscillates and transmits the ultrasonic wave. The transducer T can receive the echo of the transmitted ultrasonic wave and convert the echo into an electrical signal.

The amplifier 20 may amplify the electrical signal for the echo. More specifically, the amplifier 20 may amplify the electrical signal for the echo of the ultrasonic wave received from the transducer T, and operate by dynamically varying the amplifier gain according to a distance to an external object.

The analog-to-digital converter 30 may convert the amplified electrical signal into an original digital signal. More specifically, the analog-to-digital converter 30 may convert the electrical signal amplified by the amplifier 20 into a digital signal and transmit the digital signal to the signal processor 40.

In addition, the signal processor 40 may perform an envelope extraction processing of the original digital signal to generate an extracted signal. More specifically, the signal processor 40 may be a module for converting/processing into a signal that can be analyzed by the control unit 50, such as removing the noise of the original digital signal for the ultrasonic echo and extracting an envelope. For example, the signal processor may include a bandpass filter that filters a certain range of frequencies around a transmission frequency through various digital filters, an envelope extractor that extracts an envelope from a signal passed through the bandpass filter, a low-pass filter that extracts the noise of the extracted signal, and the like.

The control unit 50 may output a distance signal with respect to an external object based on the original digital signal and the extracted signal. The control unit 50 may include a test frequency generator 51 for applying a test frequency signal to the transducer T, an excitation frequency measuring unit 51 for measuring the excitation frequency RF generated by the transducer T, an optimum frequency calculator 53 for calculating an optimum frequency OF using the excitation frequency RF, and a transmission pulse calibrator 54 for calibrating the transmission pulse frequency in consideration of the optimum frequency OF. Here, the excitation frequency RF generated in the transducer T may be the resonance frequency of the transducer T.

For example, as shown in FIG. 2, the excitation frequency RF may be a frequency of the excitation freely oscillating in the excitation mode range between the transmission mode and the reception mode of the transducer T. Furthermore, as shown in FIG. 3, the optimum frequency OF may be an intermediate value between the excitation frequency RF and the anti-resonant frequency AF.

Accordingly, as shown in FIGS. 1 to 3, the control unit 50 of the ultrasonic sensor device according to the embodiment of the present invention may control the driving unit 10 such that the transducer T oscillates at a value between the excitation frequency RF and the anti-resonant frequency AF of the transducer T, in consideration of the transmitted test frequency and the reception sensitivity of the excitation frequency RF corresponding to the received echo of the test frequency, thereby outputting a transmission pulse.

For example, whenever the ultrasonic sensor device mounted on a vehicle operates, the control unit 50 of the ultrasonic sensor device may control the driving unit 10 such that the transducer T oscillates at a value between the excitation frequency RF and the anti-resonant frequency AF of the transducer T, in consideration of the transmitted test frequency and the reception sensitivity of the excitation frequency RF corresponding to the received echo of the test frequency, thereby outputting a transmission pulse. Thus, the ultrasonic sensor device can transmit and receive an optimal frequency in response to various environments surrounding the vehicle.

Therefore, the frequency is applied in the resonance frequency band of the transducer T to find the frequency of the reverberation signal of the transducer T, and then the amplitudes at the respective frequencies are compared together to determine the optimum transmission and reception frequencies of the transducer T such that optimal transmission and reception frequencies are found according to the physical shape and size of the transducer T and optimal transmission and reception frequencies of the transducer T are also found in various environments (temperature, humidity, old age, etc.). Therefore, an effect of improving the ability to detect objects is achieved.

Figure 4:
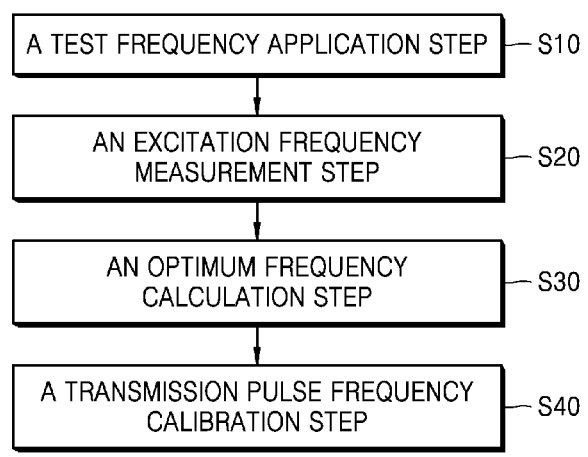
FIG. 4 is a flowchart illustrating a sensing method of an ultrasonic sensor device according to an embodiment of the present invention.

FIG. 4 is a flowchart illustrating a sensing method of an ultrasonic sensor device according to an embodiment of the present invention.

As shown in FIG. 4, the sensing method of the ultrasonic sensor device that includes a driving unit 10 for providing a transmission pulse to a transducer T, which transmits an ultrasonic wave and receives the echo of the ultrasonic wave, an amplifier 20 for amplifying the electrical signal for the echo, an analog-to-digital converter 30 for converting the amplified electrical signal into an original digital signal, a signal processor 40 for performing an envelope extraction processing of the original digital signal to generate an extracted signal, and a control unit 50 for outputting a distance signal with respect to an external object based on the original digital signal and the extracted signal, includes: a test frequency application step S10 for applying a test frequency signal to the transducer T; an excitation frequency measurement step S20 for measuring an excitation frequency RF generated in the transducer T according to the test frequency signal; an optimum frequency calculation step S30 for calculating an optimum frequency OF using the excitation frequency RF; and a transmission pulse frequency calibration step S40 for calibrating the transmission pulse frequency in consideration of the optimum frequency OF.

More specifically, in the excitation frequency measurement step S20, the excitation frequency RF generated in the transducer T may be the resonance frequency of the transducer T. For example, in the excitation frequency measurement step S20, the excitation frequency RF may be a frequency of the excitation freely oscillating in the excitation mode range between the transmission mode and the reception mode of the transducer T. In addition, the optimum frequency calculation step S30 may be a step for calculating an intermediate value between the excitation frequency RF and the anti-resonant frequency AF.

As shown in FIG. 4, according to the sensing method of an ultrasonic sensor device according to an embodiment of the present invention, the control unit 50 of the ultrasonic sensor device may control the driving unit 10 such that the transducer T oscillates at a value between the excitation frequency RF and the anti-resonant frequency AF of the transducer T, in consideration of the transmitted test frequency and the reception sensitivity of the excitation frequency RF corresponding to the received echo of the test frequency, thereby outputting a transmission pulse. Thus, the ultrasonic sensor device can transmit and receive an optimal frequency in response to various environments surrounding the vehicle.

Therefore, the frequency is applied in the resonance frequency band of the transducer T to find the frequency of the reverberation signal of the transducer T, and then the amplitudes at the respective frequencies are compared together to determine the optimum transmission and reception frequencies of the transducer T such that optimal transmission and reception frequencies are found according to the physical shape and size of the transducer T and optimal transmission and reception frequencies of the transducer T are also found in various environments (temperature, humidity, old age, etc.). Therefore, an effect of improving the sensing ability of the object is achieved.

While the present invention has been described with reference to exemplary embodiments, it is to be understood that the invention is not limited to the disclosed exemplary embodiments, but, on the contrary, is intended to cover various modifications and equivalent arrangements included within the spirit and scope of the appended claims. Therefore, the true to scope of the present invention should be determined by the technical idea of the appended claims.

What is claimed is:

1. An ultrasonic sensor device comprising:
a driving unit configured to provide a transmission pulse to a transducer that transmits an ultrasonic wave and to receive an echo of the ultrasonic wave;
an amplifier configured to amplify an electrical signal for the echo of the ultrasonic wave received from the transducer, and to operate by varying an amplifier gain according to a distance to an external object;
an analog-to-digital converter configured to convert the amplified electrical signal into an original digital signal;
a signal processor configured to perform an envelope extraction processing of the original digital signal to extract an envelope from the original digital signal to generate an extracted signal from the original digital signal; and
a control unit configured to output a distance signal with respect to the external object based on the original digital signal and the extracted signal,
wherein the control unit includes:
a test frequency generator configured to apply a test frequency signal to the transducer;

an excitation frequency measuring unit configured to measure an excitation frequency generated in the transducer;

an optimum frequency calculator configured to determine an optimum frequency using the excitation frequency which is generated in the transducer; and a transmission pulse calibrator configured to calibrate a transmission pulse frequency in consideration of the optimum frequency, wherein the excitation frequency is a frequency of an excitation freely oscillating in an excitation mode range between a transmission mode and a reception mode of the transducer, and wherein the optimum frequency is an intermediate value between the excitation frequency and an anti-resonant frequency.

2. The device of claim 1, wherein the excitation frequency generated in the transducer is a resonance frequency of the transducer.

3. A sensing method of an ultrasonic sensor device that includes a driving unit configured to provide a transmission pulse to a transducer that transmits an ultrasonic wave and to receive an echo of the ultrasonic wave, an amplifier configured to amplify an electrical signal for the echo of the ultrasonic wave received from the transducer, and to operate by varying an amplifier gain according to a distance to an external object, an analog-to-digital converter configured to convert the amplified electrical signal into an original digital signal, a signal processor configured to perform an envelope extraction processing of the original digital signal to extract an envelope from the original digital signal to generate an extracted signal from the original digital signal, and a control unit configured to output a distance signal with respect to the external object based on the original digital signal and the extracted signal, the method comprising:

a test frequency application step configured to apply, by the control unit, a test frequency signal to the transducer;

an excitation frequency measurement step configured to measure, by the control unit, an excitation frequency generated in the transducer according to the test frequency signal;

an optimum frequency calculation step configured to determine, by the control unit, an optimum frequency using the excitation frequency which is generated in the transducer; and a transmission pulse frequency calibration step configured to calibrate, by the control unit, a transmission pulse frequency in consideration of the optimum frequency, wherein, in the excitation frequency measurement step, the excitation frequency is a frequency of an excitation freely oscillating in an excitation mode range between a transmission mode and a reception mode of the transducer, and wherein the optimum frequency calculation step includes a step configured to calculate an intermediate value between the excitation frequency and an anti-resonant frequency, as the optimum frequency.

4. The method of claim 3, wherein, in the excitation frequency measurement step, the excitation frequency generated in the transducer is a resonance frequency of the transducer.

\* \* \* \* \*